United States Patent
Park et al.

(10) Patent No.: US 9,588,379 B2
(45) Date of Patent: Mar. 7, 2017

(54) CURVED LIQUID CRYSTAL DISPLAY PANEL

(71) Applicant: Samsung Display Co., LTD., Yongin, Gyeonggi-Do (KR)

(72) Inventors: Min-Wook Park, Asan-si (KR); Joo-Hwan Park, Yongin-si (KR); Jeong-Man Son, Suwon-si (KR)

(73) Assignee: Samsung Display Co., Ltd. (KR)

( * ) Notice: Subject to any disclaimer, the term of this patent is extended or adjusted under 35 U.S.C. 154(b) by 23 days.

(21) Appl. No.: 14/249,164

(22) Filed: Apr. 9, 2014

(65) Prior Publication Data
US 2015/0116621 A1    Apr. 30, 2015

(30) Foreign Application Priority Data
Oct. 30, 2013 (KR) .................. 10-2013-0130225

(51) Int. Cl.
G02F 1/1335 (2006.01)
G02F 1/1339 (2006.01)
G02F 1/1333 (2006.01)

(52) U.S. Cl.
CPC .... *G02F 1/13394* (2013.01); *G02F 1/133305* (2013.01)

(58) Field of Classification Search
CPC ............... G02F 1/13394; G02F 1/133305
USPC .................................................. 349/158
See application file for complete search history.

(56) References Cited

U.S. PATENT DOCUMENTS

| | | | | |
|---|---|---|---|---|
| 2002/0027636 A1* | 3/2002 | Yamada | ............ | G02F 1/133305 349/155 |
| 2004/0233352 A1* | 11/2004 | Chen | ................. | G02F 1/136209 349/106 |
| 2006/0226426 A1* | 10/2006 | Park | ..................... | G02F 1/13394 257/59 |
| 2007/0132936 A1* | 6/2007 | Lee | ..................... | G02F 1/13394 349/156 |
| 2009/0161048 A1* | 6/2009 | Satake | .............. | G02F 1/133305 349/110 |
| 2011/0228190 A1* | 9/2011 | Yang | ................... | G02F 1/13394 349/56 |

FOREIGN PATENT DOCUMENTS

| | | |
|---|---|---|
| JP | 2002-350864 | 12/2002 |
| JP | 2006-106603 | 4/2006 |
| JP | 4041703 | 11/2007 |
| JP | 2008-112001 | 5/2008 |

(Continued)

*Primary Examiner* — Charles Chang
(74) *Attorney, Agent, or Firm* — Innovation Counsel LLP

(57) ABSTRACT

A curved liquid crystal display panel includes a first substrate, a liquid crystal layer and a second substrate. The first substrate includes a column spacer fixedly anchored to and protruding therefrom. The second substrate includes a stepless preliminary contact area corresponding to a contact-making free end of the column spacer where the preliminary contact area is part of a larger and also non-stepped area. The second substrate is combined with the first substrate to receive the liquid crystal layer therebetween. The non-stepped area is dimensioned to account for shift of the where the contact-making free end of the column spacer makes contact due to the curvature of the first and second substrates.

11 Claims, 11 Drawing Sheets

(56) References Cited

FOREIGN PATENT DOCUMENTS

| JP | 2009-115933 | 5/2009 |
| JP | 5159385 | 12/2012 |
| KR | 1020070089352 A | 8/2007 |
| KR | 10-1048701 | 7/2011 |

* cited by examiner

CURVED LIQUID CRYSTAL DISPLAY PANEL

CROSS-REFERENCE TO RELATED APPLICATIONS

This application claims priority under 35 U.S.C. §119 to Korean Patent Application No. 10-2013-0130225, filed on Oct. 30, 2013 in the Korean Intellectual Property Office (KIPO), the contents of which application are herein incorporated by reference in their entirety.

BACKGROUND

Technical Field

The present disclosure of invention relates to a curved liquid crystal display ("LCD") panel. More particularly, it relates to a curved LCD panel capable of enhancing a display quality.

Discussion of Related Technology

In recent years, as the liquid crystal display device ("LCD") has come to be popularly used as a display device for television receivers and other multi-user applications, the screens of such liquid crystal display devices have been trending towards becoming increasingly bigger. But a problem with such increasingly larger (e.g., wider) television LCD screens is that the quality of viewing experience changes substantially between when a centered user views the screen while focusing on the center portion of the screen and when the centered user focuses his/her view to the left or right edges of the wide display screen. The problem can be worse for a second user situated closer to the left or right edge of the wide display screen and trying to focus eyesight on the much further away (and more angled relative to the screen normal) opposite edge of the wide display screen.

Curved display screens have been proposed a solution to this problem. In this specification, the technical term "viewing angle" is used and is defined as the acute or right angle formed between the line of focusing sight of the viewer viewing the horizontally wide screen and a horizontal tangent line that is tangent to the curved spot on the screen where the user's line of sight intersects with the screen surface. In other words, the "viewing angle" of a horizontally centered user who focuses on the center of the screen is the right angle (90 degrees) while the "viewing angle" of the same user when focusing on a right edge or a left edge is, for the case of an almost flat screen, an acute angle (less than 90 degrees). The difference in "viewing angle" between when the centered user views the center and when he/she focuses on the left/right edge is defined as, and is used herein as being the "viewing angle difference". More specifically, if the "viewing angle" for the left or right edge is 60 degrees, then the "viewing angle difference" will be the complement of that, namely, 30 degrees. If sameness of viewing experience is desired under these terms, then the "viewing angle difference" should be reduced towards zero (0) degrees.

Furthermore, another problem with flat-type large-scale television LCD screens is that glare off the screens also increases. Both the side glare problem and the problem of difference in viewing angle can be corrected by curving the screen into a concave shape.

Uniformity of viewing experience as between on-center focus and towards-edge focus also depends on uniformity of thickness of the liquid crystal material in the respective portions the screen (e.g., the screen center and screen extreme left and right side edges). Typically, so-called, column spacers having a uniform cross-section over their respective heights (e.g., cylinder shaped) are formed on one of the upper and lower substrates of a LCD panel so as to maintain a uniform cell gap of a liquid crystal layer across the full width of the panel. In a case of a curved LCD panel having a color filter on array ("COA") type where a color filter layer is formed on the lower substrate, a step variation can be generated due to how the consistent-in-cross-section column spacers engage as between the opposed inner surfaces of the upper and lower substrates, so that display defects of the LCD panel are generated as a function of the shapes and/or a positions of the column spacers.

In the case of curved LCD panels, display color defects such as bluish or yellowish color tinting can occur due to a misalignment between an upper substrate and a lower substrate. This is mainly because changes of cell gap are generated in panels structured to have same, consistent-in-cross-section column spacers formed everywhere on a COA type LCD panel.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a curved liquid crystal display ("LCD") panel capable of preventing display characteristics from being decreased by removing display defects due to preliminary design misalignment between an upper substrate and a lower substrate where the misalignment is due to the LCD panel being curved.

According to one aspect of the present teachings, a curved LCD panel includes a first substrate, a liquid crystal layer and a second substrate. The first substrate includes a column spacer having a base portion anchored to and protruding from the first substrate. The second substrate includes a preliminary contact area corresponding to where an opposed and free contact making end of the column spacer is preliminarily designed to make contact assuming no curvature and where the preliminary contact area is part of a larger non-stepped area (e.g., a planarized area) which is dimensioned to account for misalignment of the free contact making end, the misalignment being due to curvature of the display panel. The second substrate is combined with the first substrate to receive the liquid crystal layer.

In an exemplary embodiment, the non-stepped area may be formed along a curvature direction of the curved LCD panel.

In an exemplary embodiment, a length of the non-stepped area may be in proportion to a size of the curved LCD panel and may be in inverse proportion to a curvature radius of the curved LCD panel.

In an exemplary embodiment, a length of the non-stepped area satisfies the following equation:

$$D \geq \frac{L \times T}{R} \times 0.1,$$

wherein, 'D' denotes a length of the planarized area, 'L' denotes a length of a panel in parallel with a curvature direction, 'T' denotes a thickness of a base substrate of the first substrate or a thickness of a base substrate of the second substrate, and 'R' denotes a curvature radius.

In an exemplary embodiment, the first substrate may include a lower substrate on which a plurality of switching elements is formed. Here, the second substrate may include a light-blocking layer formed in a stripes only type of arrangement in parallel with each other. In this case, the light-blocking layer may be in parallel with gate lines respectively connected to corresponding switching elements.

In an exemplary embodiment, the first substrate may include a lower substrate on which a plurality of switching elements and a color filter layer covering the switching element are formed. In this case, the column spacer may be formed on and anchored to the color filter layer.

In an exemplary embodiment, the second substrate may include a lower substrate on which a plurality of switching elements is formed. In this case, the column spacer continues to be formed on and protruding from the first substrate.

In an exemplary embodiment, the second substrate may include a light-blocking layer formed in a stripes type in parallel with each other. In this case, the light-blocking layer may be in parallel with a gate line connected to the switching element.

In an exemplary embodiment, the second substrate may include a lower substrate on which a plurality of switching elements and a color filter layer covering the switching element are formed. In this case, the column spacer may be formed on the first substrate.

In an exemplary embodiment, the color filter layer may include a first color filter layer and a different second color filter layer. In this case, an overlapped portion of the first color filter layer and the second color filter layer may be planarized to define the non-stepped area.

In an exemplary embodiment, the curved LCD panel may have a concave shape.

In an exemplary embodiment, curved LCD panel may have a convex shape.

According to some exemplary embodiments of the present disclosure of invention, a planarized area surrounding a preliminary contact area corresponding to an upper surface of a column spacer is formed, so that it may prevent a cell gap from being varied due to a misalignment between a first substrate and a second substrate even through an LCD panel is curved. Thus, it may remove display defects due to a cell gap variation, thereby enhancing display characteristics.

BRIEF DESCRIPTION OF THE DRAWINGS

The above and other features and aspects of the present disclosure of invention will become more apparent by describing in detailed exemplary embodiments thereof with reference to the accompanying drawings, in which.

DETAILED DESCRIPTION

Hereinafter, curved LCD panels according to the present disclosure of invention will be explained in detail with reference to the accompanying drawings.

Figure 1:
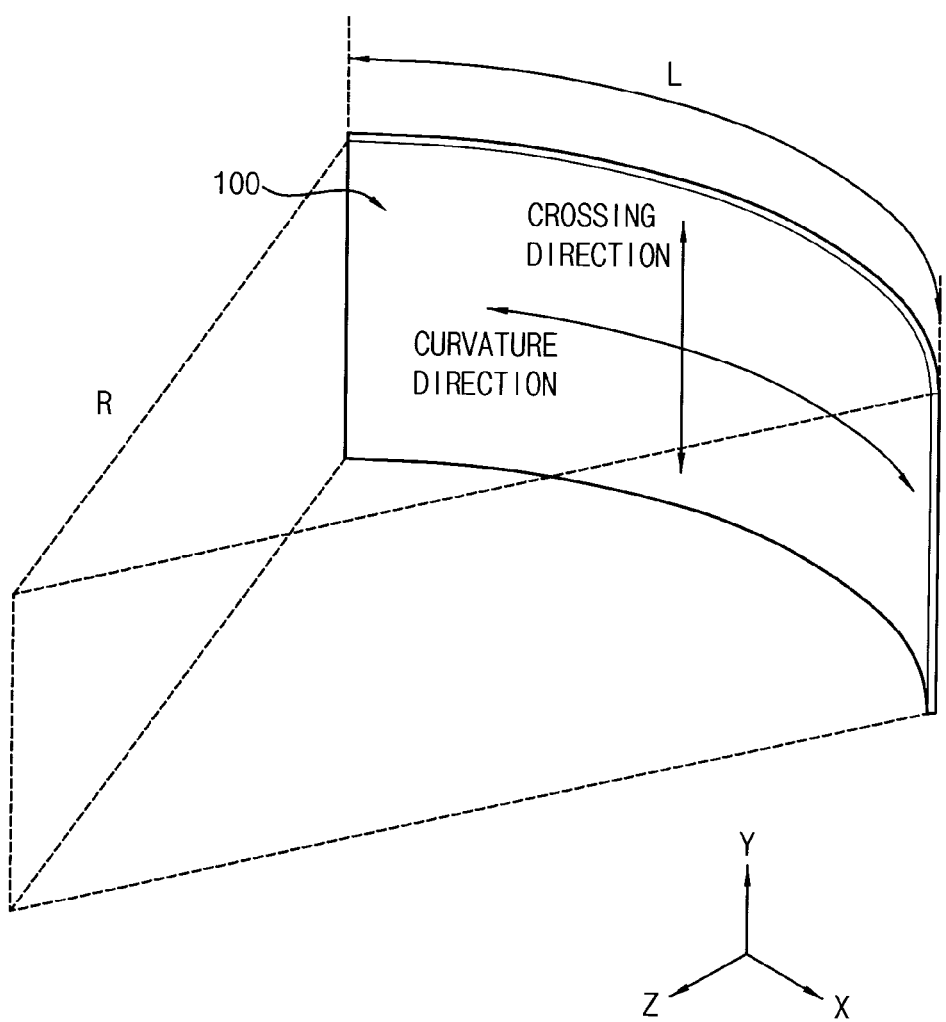
FIG. 1 is a perspective view schematically illustrating a curved liquid crystal display ("LCD") panel according to an exemplary embodiment of the present disclosure of invention.
Figure 2A:
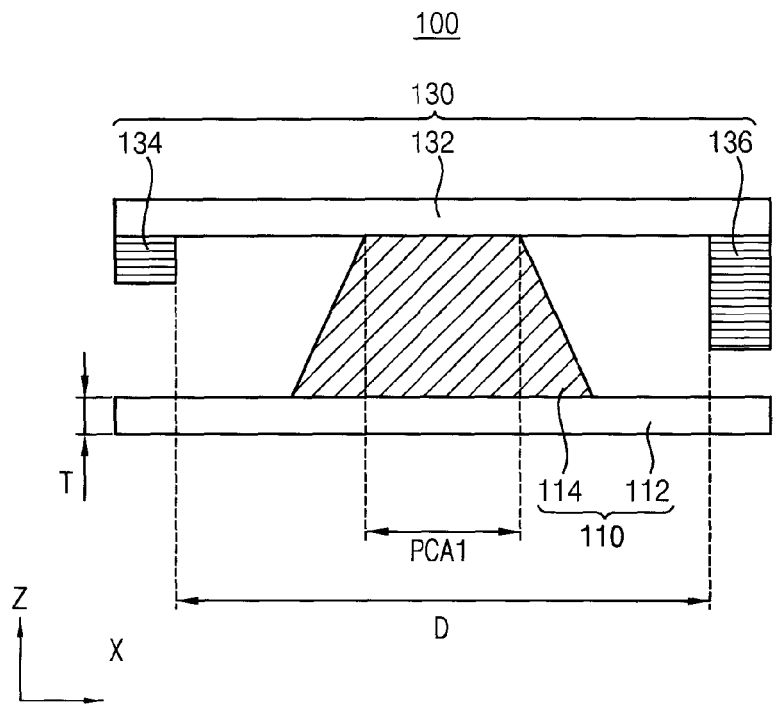
FIG. 2A is a cross-sectional view schematically illustrating a column spacer of the curved LCD panel shown in FIG. 1 where the illustrated column spacer is not a consistent-in-cross-section column spacer.
Figure 2B:
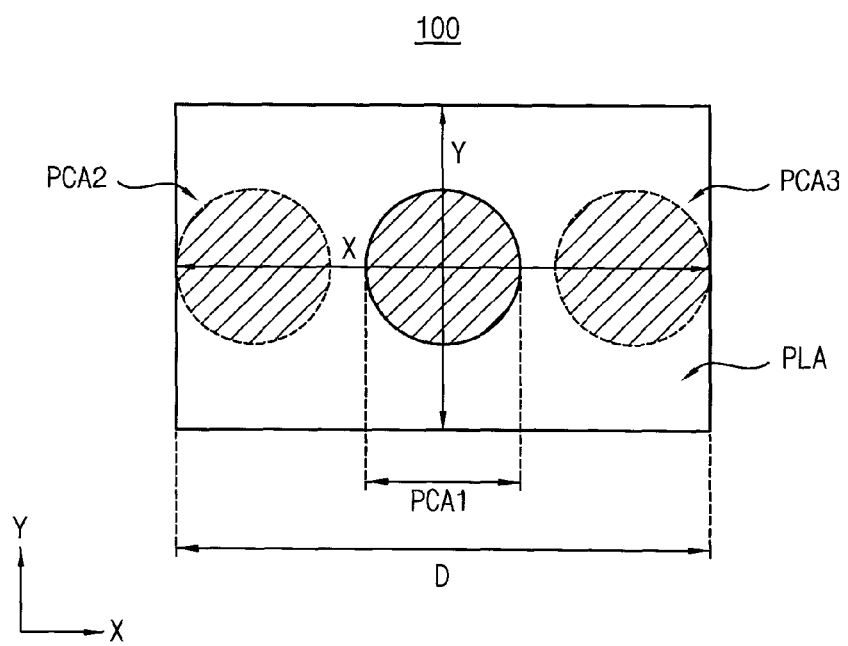
FIG. 2B is a plan view schematically illustrating preliminary contact areas corresponding to the column spacer and a planarized area shown in FIG. 2A.

FIG. 1 is a perspective view schematically illustrating a concave-wise curved liquid crystal display ("LCD") panel 100 according to an exemplary embodiment of the present disclosure. FIG. 2A is a cross-sectional view schematically illustrating a column spacer 114 of the curved LCD panel 100 shown in FIG. 1. FIG. 2B is a plan view schematically illustrating preliminary contact areas corresponding to the column spacer 114 and a planarized area shown in FIG. 2A.

Referring to FIGS. 1, 2A and 2B, a curved LCD panel 100 according to an exemplary embodiment of the present disclosure of invention starts off as being in a preliminarily flat condition and then it is bent from the middle out to its left and right edges so as to be concavely curved and to have a uniform curvature of radius R about a center spot when viewed in an X-Y plan view sense. The curvature radius R corresponding to the attained uniform curvature may be about 1,000 mm to about 9,000 mm.

The curved LCD panel 100 includes a first or "lower" substrate 110, a liquid crystal layer 120 and a second or "upper" substrate 130 combined with the lower/first substrate 110 and spaced apart therefrom so as to receive the liquid crystal layer 120 in between. For sake of consistency and the concave curving example of FIG. 1, the lower/first substrate 110 will be deemed to be further away from the centered viewer (and also further away from the center of curvature) while the "upper" second substrate 130 (higher up on the local Z-axis) will be deemed to be closer. The curvature radius R will be deemed to be measured from the center of curvature to the top of the lower/first substrate 110 such that the illustrated "L" dimension is the width of the curved lower/first substrate 110 measured from end to end. As those skilled in the geometric arts will appreciate, the corresponding width of the curved "upper" second substrate 130 may be slightly smaller when measured from where the left side radius R intersects to where the right side radius R intersects. This is so because the arc length of a circular segment is a function of the swept angle (e.g., measured in radians) times the length of the effective radius, where for the case of the upper/second substrate 130 that effective radius R' is slightly smaller than the effective radius R for the lower/first substrate 110. Accordingly, when the preliminarily flat structure is bent to achieve the illustrated curvature of FIG. 1, points on the upper/second substrate 130 (except for the center point) will shift slightly relative to corresponding on same-radial-line points on the lower/first substrate 110. Although the amount of shift can be small, it nonetheless is greater than zero and can be consequential.

Referring to FIG. 2A, the first substrate 110 includes a first base substrate 112 and a column spacer 114 fixedly formed on and protruding upwardly (in the positive Z direction) from the first substrate 112 to the second 130 so as to maintain a desired cell gap of the liquid crystal layer 120. The first base substrate 112 may have a transparent material such as a glass, a glass fiber reinforced plastic, etc.

The second substrate 130 includes a second base substrate 132 and, for sake of exemplary discussion here, a plurality of spaced apart stepped portions 134 and 136 separated from each other by a distance D and fixedly formed on the second base substrate 132. The top of the frusto-conically shaped column spacer 114 may shift within the expanse (planarized area, non-stepped area) of the separation distance D as the two substrates (110 and 130) are brought into contact and both simultaneously bent to achieve the illustrated curvature of FIG. 1. The second base substrate 132 may have a transparent material such as a glass, a glass fiber reinforced plastic, etc. The illustrated stepped portions 134 and 136 may be protruding ones of various elements or various layers formed on the second substrate 130 and used for example to drive a display of the curved LCD panel 100. When the top of the frusto-conically shaped column spacer 114 shifts during bending, it is desirable that it should not shift so much as to hit either one of the stepped portions 134 and 136 at the outer bounds of the non-stepped separation distance D. In an example, heights of the stepped portions 134 and 136 may be equal to each other. In another example, heights of the stepped portions 134 and 136 may be different from each other. In either case, the expanse of distance D is an unstepped one into which the narrower end of the frusto-conically shaped column spacer 114 makes contact either before bending or after bending and is an expanse within which the contacting area (CA) of the column spacer 114 may shift as a result of the bending. Hereinafter, the non-stepped separation distance D within which the narrower end of the column spacer 114 makes contact will also be referred to as a "planarized area" where, in the context of the present disclosure, the "planarized" portion of the phrase does not necessarily mean always flat, but rather one that would be flat if the substrate is considered as being in a nonbent preliminary state.

When the first substrate 110 is a TFT-array type lower substrate on which plural switching elements are formed, the second substrate 130 may be a common electrode type upper substrate on which a common electrode is sometimes formed. However, it is within the contemplation of the present disclosure that alternatively, the second substrate 130 is a TFT-array type substrate on which plural switching elements are formed and the first substrate 110 is a common electrode type, opposed substrate.

In accordance with the present disclosure, the second/upper substrate 130 is patterned to include a preliminary contact area PCA1 which corresponds to a location where an upper surface of the column spacer 114 would make contact if the first and second substrates are preliminarily each in a flat state, brought together as such and afterwards bent. Moreover, the second/upper substrate 130 is patterned to include a planarized area PLA of width D, centered on and surrounding the preliminary contact area PCA1. FIG. 2B shows the case where the preliminary contact area PCA1 is an area corresponding to an upper surface of the column spacer 114 designed in correspondence with a flat type LCD panel that is afterwards bent to become a curved type LCD panel.

When the preliminary contact area PCA1 corresponds with a center portion of a flat type (pre-bending) LCD panel, an upper surface of a column spacer 114 makes preliminary contact with the preliminary contact area PCA1 before the flat type LCD panel is bent to be concavely or convexly curved when viewed from an X-Y plan view perspective. The width D of the planarized area (PLA) is set to accommodate for an expected maximum shift of position (misalignment) away from the preliminary contact area PCA1 that the upper surface of a column spacer 114 will make as the substrates are bent in accordance with a predetermined curvature radius R.

When a preliminarily-designed as a flat LCD panel is re-purposed to be concavely curved when viewed from an X-Y plan sense, those of its column spacers 114 which are formed near the extreme right end of the LCD panel will have their landing spots in the PLA landing zone maximally shifted in a first direction (e.g., leftward) away from the referenced PCA1 portion to new position PCA2 while those of its column spacers 114 which are formed near the extreme left end will have their respective landing spots in the PLA landing zone maximally shifted in an opposed second direction (e.g., rightward) away from the referenced PCA1 portion and to new position identified by reference numeral PCA3. The planarized landing zone area PLA may be designed (in accordance with one embodiment) to accommodate for both shifts.

On the other hand, when a preliminarily flat type LCD panel is bent to be convexly curved (as opposed to concavely curved) when viewed from an X-Y plan view sense, column spacers 114 formed at the far right portion of the flat type LCD panel will be maximally shifted into the PCA3 portion, while column spacers 114 formed at the far left portion of the flat type LCD panel will be maximally shifted into the PCA2 position. However, since the planarized area PLA is dimensioned to handle misalignment shifts in either direction, the same design can be used for preliminarily flat type LCD panels that are to be bent to be either convexly curved or concavely curved.

The planarized area PLA is formed along a curved surface direction of a curved LCD panel. When the first surface 110 and the second surface 130 is combined with each other to form a curved LCD panel, the planarized area PLA is designed to provide leeway with margin of error for the maximal misalignment amount of the curved LCD panel. When the first and second substrates are bent from the middle out (meaning the far ends can be moved while the middle stays in place during bending), then the misalignment amount is zero for the column spacer 114 located in the middle, in other words, those which correspond to a line shown as the crossing direction in FIG. 1 which line is substantially perpendicular to a curvature direction of the curved LCD panel. However, the misalignment amount increases to be progressively greater than zero for column spacers 114 disposed horizontally further and further away from the center portion of the curved LCD panel. Thus, it is designed that the planarized area PLA is greater than the maximum of the misalignment amount.

Figure 3:
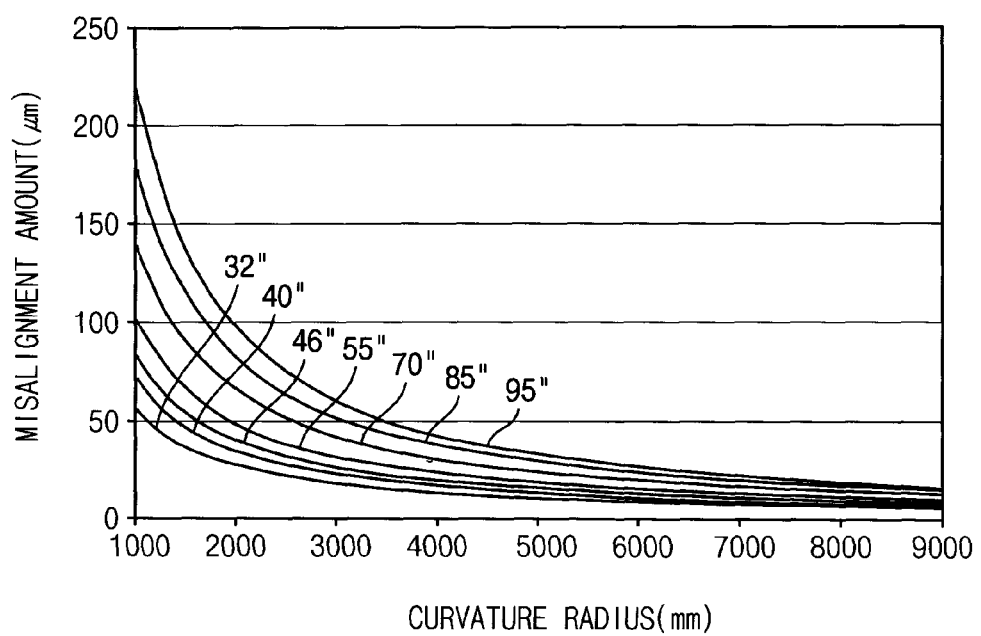
FIG. 3 is a graph schematically explaining a misalignment amount between an upper substrate and a lower substrate in accordance with a curvature per sizes of a curved LCD panel.

FIG. 3 is a graph schematically explaining the expected maximal misalignment amounts between an upper substrate and a lower substrate in accordance with a curvature radius (R) per different sizes (e.g., screen diagonal measures) of a curved LCD panel.

Referring to FIG. 3, the misalignment amount is greater when the curvature radius is made smaller, and the misalignment amount is relatively smaller as the curvature radius is made bigger. That is, each curved LCD panels having the different sizes has a misalignment amount that may be deemed to be exponentially decaying in accordance with an increasing of a curvature radius R.

For example, in a case of a 32-inch diagonal curved LCD panel, a misalignment amount is about 60 µm when a curvature radius is about 1,000 mm, and a misalignment amount is about 26 µm when a curvature radius is about 2,000 mm. Moreover, a misalignment amount is about 20 µm when a curvature radius is about 3000 mm, and a misalignment amount is about 18 µm when a curvature radius is about 4,000 mm. In this way, the maximal misalignment amount is exponentially decaying, so that the maximal misalignment amount is about 5 µm when a curvature radius is about 9,000 mm.

In a case of a 55-inch curved LCD panel, a misalignment amount is about 100 µm when a curvature radius is about 1,000 mm, and a misalignment amount is about 50 µm when a curvature radius is about 2,000 mm. Moreover, a misalignment amount is about 30 µm when a curvature radius is about 3000 mm, and a misalignment amount is about 25 µm when a curvature radius is about 4,000 mm. In this way, a misalignment amount is exponentially decaying, so that a misalignment amount is about 6 µm when the curvature radius (R) is about 9,000 mm.

In a case of a 95-inch curved LCD panel, a misalignment amount is about 220 µm when a curvature radius is about 1,000 mm, and a misalignment amount is about 100 µm when a curvature radius is about 2,000 mm. Moreover, a misalignment amount is about 65 µm when a curvature radius is about 3000 mm, and a misalignment amount is about 40 µm when a curvature radius is about 4,000 mm. In this way, a misalignment amount is exponentially decaying, so that a misalignment amount is about 15 µm when the curvature radius is about 9,000 mm.

It may therefore be determined from the plots of FIG. 3 that the maximal misalignment amount is differently generated in accordance with the desired curvature radius (R) and the desired size (diagonal measure) of the curved LCD panel. Moreover, and although not shown in FIG. 3, It may be determined that the maximal misalignment amount is differently generated in accordance with a thickness of a base substrate of an upper substrate (e.g., the first base substrate 112 of the first substrate 110 shown in FIG. 2A) or a thickness of a base substrate of a lower substrate (e.g., the second base substrate 132 of the second substrate 130 shown in FIG. 2A).

In accordance with the present disclosure of invention, the substrate (e.g., the upper substrate 110) which has the preliminary contact areas (PCNs) is patterned such that the corresponding planarized (meaning stepless) landing zone areas (PLA's) each have an S index greater than 0.1 In this case, the S index is defined by the following Equation 1.

$$S = \frac{R \times M}{L \times T}$$ [Equation 1]

Here, 'L' denotes a length of a curved LCD panel in parallel with a curvature direction, 'T' denotes a thickness of the first base substrate 112 of the first substrate 110 or a thickness of the second base substrate 132 of the second substrate 130. 'R' denotes a curvature radius, and 'M' denotes a misalignment amount of an upper substrate and a lower substrate. In this case, the measurement units of L, T, R and M are all in millimeters (mm).

When the S index is calculated per sizes of a curved LCD panel and curvature radius of a curved LCD panel, it produces the following Table 1. Here, it was calculated that a thickness of a base substrate is about 0.7 mm.

TABLE 1

| Curvature radius(mm) | 32" | 40" | 46" | 55" | 70" | 85" | 95" |
| --- | --- | --- | --- | --- | --- | --- | --- |
| 1,000 | 0.11 | 0.11 | 0.11 | 0.11 | 0.13 | 0.13 | 0.14 |
| 2,000 | 0.11 | 0.11 | 0.11 | 0.11 | 0.12 | 0.13 | 0.13 |
| 3,000 | 0.11 | 0.11 | 0.11 | 0.11 | 0.11 | 0.11 | 0.12 |
| 4,000 | 0.11 | 0.11 | 0.11 | 0.11 | 0.11 | 0.11 | 0.11 |
| 5,000 | 0.11 | 0.11 | 0.11 | 0.11 | 0.11 | 0.11 | 0.11 |
| 6,000 | 0.11 | 0.11 | 0.11 | 0.11 | 0.11 | 0.11 | 0.11 |
| 7,000 | 0.11 | 0.11 | 0.11 | 0.11 | 0.11 | 0.11 | 0.10 |
| 8,000 | 0.11 | 0.11 | 0.11 | 0.11 | 0.11 | 0.11 | 0.10 |
| 9,000 | 0.11 | 0.11 | 0.11 | 0.11 | 0.11 | 0.10 | 0.10 |

Referring to Table 1, when a 32-inch LCD panel is curved to have a curvature radius R of about 1000 mm, the corresponding S index was calculated as about 0.11. Moreover, when a 32-inch LCD panel is curved to have curvature radiuses of about 1000 mm, about 2000 mm, about 3000 mm, about 4000 mm, about 5000 mm, about 6000 mm, about 7000 mm, about 8000 mm and about 9000 mm, respectively, S index was calculated as about 0.11. Similarly, when a 32-inch LCD panel, 40-inch LCD panel, a 46-inch LCD panel, a 55-inch LCD panel, a 70-inch LCD panel, 85-inch LCD panel and a 95-inch LCD panel are respectively curved to have curvature radiuses of about 1000 mm to about 9000 mm, it is determined that S index is greater than or equal to about 0.10.

Thus, when it is desired that the planarized area PLA have an S index greater than 0.1, a column spacer is shifted within the planarized area PLA even though an LCD panel is curved so that a cell gap of liquid crystals may be maintained.

Moreover, it may prevented display defects such as bluish or yellowish due to a misalignment between an upper substrate and a lower substrate from being generated.

The planarized area PLA is formed along a curvature direction of the curved LCD panel 100. A length of the planarized area PLA is in proportion to a size of the curved LCD panel 100 and is in inverse proportion to a curvature radius of the curved LCD panel 100. For example, a margin for error is included if the designed length of the planarized area PLA satisfies the following Equation 2.

$$D \geq \frac{L \times T}{R} \times 0.1$$ [Equation 2]

Here, 'D' denotes a designed length of the planarized area PLA, 'L' denotes a length of a panel in parallel with a curvature direction, 'T' denotes a thickness of the first base substrate 112 of the first substrate 110 or a thickness of the second base substrate 132 of the second substrate 130, and 'R' denotes a curvature radius.

Figure 4:
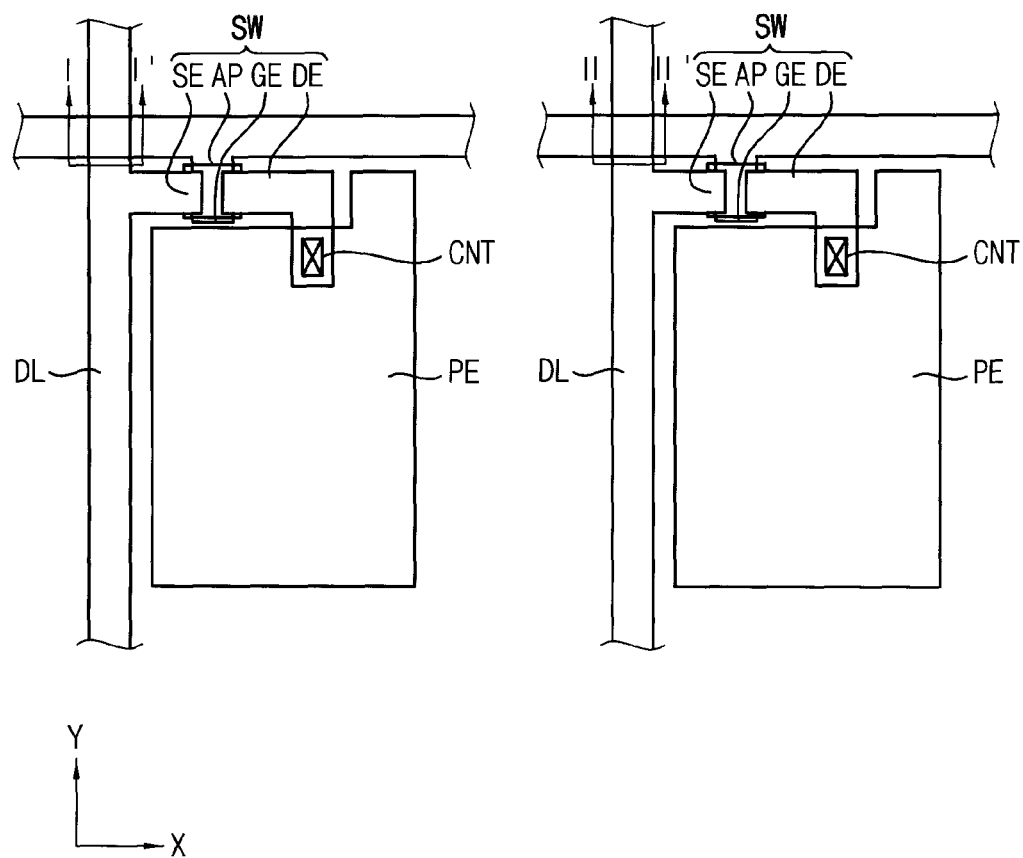
FIG. 4 is a plan view schematically explaining a unit pixel positioned at a left portion of the curved LCD panel and a unit pixel positioned at a right portion of the curved LCD panel shown in FIG. 1.

FIG. 4 is a top plan view schematically showing two of repeated unit pixel cells, one positioned at a left portion of the curved LCD panel 100 and the other positioned at a right portion of the curved LCD panel 100 shown in FIG. 1.

Referring to FIG. 4, a lower substrate of the curved LCD panel 100 has integrally formed thereon, a plurality of gate lines GL, a plurality of data lines DL crossing the gate lines GL, a plurality of switching elements SW connected to the gate line GL and the data line DL, and a plurality of pixel electrodes PE respectively connected to the switching elements SW.

The gate lines GL extend longitudinally substantially in an X-axis direction and are arranged to be spaced apart substantially along a Y-axis direction. Each of the gate lines GL provides the switching element SW with a gate signal to turn on the switching element SW. The gate lines GL may include a material such as aluminum (Al), molybdenum (Mo), neodymium (Nd), chromium (Cr), tantalum (Ta), titanium (Ti), tungsten (W), silver (Ag), etc., or a metal alloy thereof.

The data lines DL extend substantially in the Y-axis direction and arranged to be spaced apart substantially along the X-axis direction. The data lines DL provide the switching elements SW with a data signal. In such an embodiment, when the switching elements SW are turned on, the data signal is transmitted to the pixel electrodes PE. The data lines DL may include at least one of aluminum (Al), aluminum (Al) alloy, molybdenum (Mo), molybdenum (Mo) alloy, chromium (Cr), chromium (Cr) alloy, tantalum (Ta), tantalum (Ta) alloy titanium (Ti), titanium (Ti) alloy tungsten (W), tungsten (W) alloy, copper (Cu), copper (Cu) alloy, silver (Ag) and silver (Ag) alloy, for example.

Each of the switching elements SW includes a control terminal (hereinafter, a gate electrode GE), a semiconductive active layer AP, an input terminal (hereinafter, a source electrode SE) and an output terminal (hereinafter, a drain electrode DE), which are respectively connected to the gate line GL and the data line DL. In an exemplary embodiment, each of the switching elements SW may be a thin-film transistor ("TFT"). In an exemplary embodiment, the switching elements SW are described as TFTs having a bottom gate structure on which a gate electrode is disposed below a source electrode and a drain electrode; however, it is not limited thereto. In one alternative exemplary embodiment, for example, the switching elements SW may be TFTs having an on-top gate structure on which a gate electrode is disposed above the corresponding source and drain electrodes.

After a semiconductive metal oxide or polysilicon doped with impurities at a high concentration is deposited, the gate electrodes GE may be provided, e.g., formed, by patterning the metal oxide or the poly-silicon through a photolithography process and etching process using a mask.

The active layer AP may include amorphous silicon or poly-silicon or a semiconductive metal oxide. In the case of poly-silicon, the latter may be formed by crystallizing deposited amorphous silicon using a laser, for example.

A gate insulation layer GIL is provided on the gate electrodes GE and the gate lines GL. The gate insulation layer GIL may include a silicon oxide (SiOx), a silicon nitride (SiNx) or a laminated combination of both.

A pixel electrode PE is electrically connected to a drain electrode DE of a switching element SW through a contact hole CNT formed through an organic layer OL including an organic material such as a polyimide ("PI") resin, a polyethersulfone ("PES") resin, a polyethyleneterephthalate ("PET") resin, a polyarylate ("PAR") resin and an acrylite resin, for example. The pixel electrode PE receives a data signal provided from the switching element SW. In an exemplary embodiment, the pixel electrode PE may be formed by sputter depositing an optically transparent and electrically conductive material, such as indium tin oxide ("ITO") and indium zinc oxide ("IZO"), for example, on the gate insulation layer GIL, and then by patterning the optically transparent and electrically conductive material through a photolithography process and etching process using a mask.

Figure 5:
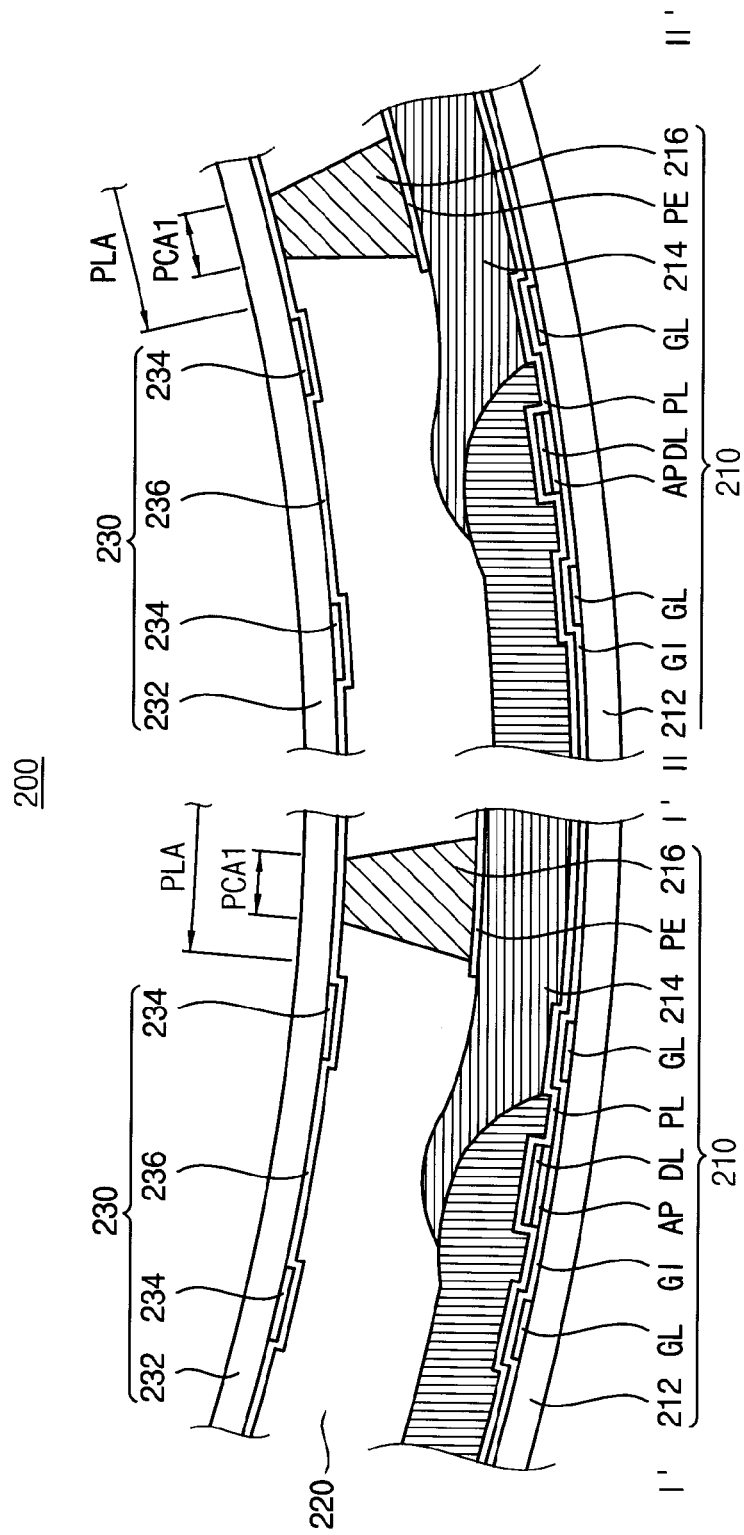
FIG. 5 is a cross-sectional view schematically illustrating an example of the curved LCD panel shown in FIG. 1.

FIG. 5 is a cross-sectional view schematically illustrating an example of the curved LCD panel 100 shown in FIG. 1. That is, it is shown that a column spacer is fixedly formed to have a wider base portion anchored on a lower substrate 210 on which a color filter layer is formed and a light-blocking layer is removed from an upper substrate. In such an embodiment, cross-sectional views taken along a line I-I' and a line II-II' in FIG. 4 are shown.

Referring to FIG. 5, a curved LCD panel 200 according to the illustrated example includes a lower substrate 210, a liquid crystal layer 220 and an upper substrate 230 to be concavely curved to have a uniform curvature when viewed from an X-Y plan view sense.

The lower substrate 210 includes a first base substrate 212 which is concavely curved to have a uniform curvature. A plurality of gate lines GL, a gate insulation layer GI, an active layer AP, a plurality of data lines DL and a plurality of switching elements (not shown) connected to the gate lines GL and the data lines DL, respectively, are formed on the first base substrate 212. A passivation layer PL is formed on the gate insulation layer GI and the switching element. A color filter layer 214 is formed on the passivation layer PL. A pixel electrode PE connected to a drain electrode of the switching element is formed on the color filter layer 214. A column spacer 216 is formed on a portion of the pixel electrode layer PE. Alternatively, the column spacer 216 may be formed directly on the color filter layer 214. Moreover, the column spacer 216 may be formed partly on a portion of the pixel electrode PE and partly in direct contact with an adjacent portion of the color filter layer 214.

The upper substrate 230 is combined (joined together) with the lower substrate 210 to receive the liquid crystal layer 220 in between. The upper substrate 230 includes a second base substrate 232 which is concavely curved to have a uniform curvature and a patterned light-blocking layer 234 which is formed on the second base substrate 232 in correspondence with a gate line GL of the lower substrate 210. A common electrode layer 236 is formed on the second base substrate 232 and the patterned light-blocking layer 234.

The upper substrate 230 is patterned so as to include a non-stepped, contact landing area PLA which includes at its center, the preliminary contact area PCA1 corresponding to where, if the panel were not bent, an upper surface area of the column spacer 216 would be expected to come into contact with the planarized area PLA. In other words, no stepped portions are present either within the preliminary contact area PCA1 or within the rest of the planarized landing zone area PLA.

In the present exemplary embodiment, the light-blocking layer is patterned so as to be absent in vertically extending areas corresponding to the vertically extending data lines DL of the lower substrate 210 and instead light blocking is provided thereat by overlap of two or more different colored color filter layers 214. Thus, the light-blocking layer is formed in a stripe type pattern in parallel with the gate lines GL rather than in a matrix pattern that further extends vertically above the data lines (DL) as well. Therefore, since the upper substrate 230 has fewer stepped portions (e.g., 234), larger non-stepped areas are made available to serve as stepless contact landing zones (PLA's) for the corresponding column spacers 216.

Figure 6:
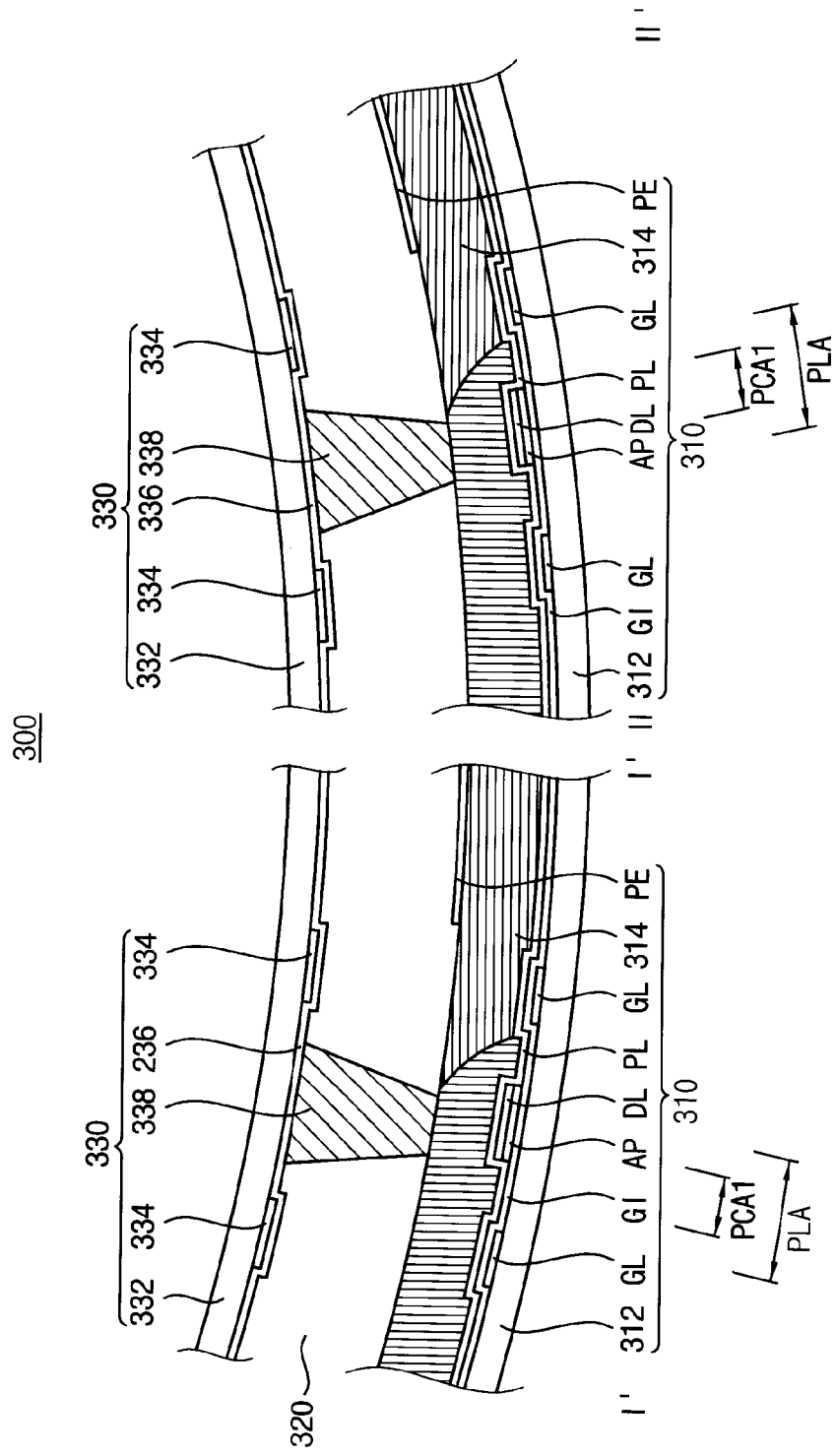
FIG. 6 is a cross-sectional view schematically illustrating another example of concave curved LCD panel such as shown in FIG. 1.

FIG. 6 is a cross-sectional view schematically illustrating another example of the curved LCD panel shown in FIG. 1. Here the wider bases of the column spacers 338 are fixedly attached to the upper substrate 330 and the contact landing zones (PLA's) are formed as stepless features on the lower substrate 310. That is, it is shown that a column spacer is formed to make contact on a lower substrate on which a color filter layer is formed and a light-blocking layer is removed in the corresponding area of the upper substrate. In such an embodiment, cross-sectional views taken along a line I-I' and a line II-II' in FIG. 4 are shown.

Referring to FIG. 6, a curved LCD panel 300 includes a lower substrate 310, a liquid crystal layer 320 and an upper substrate 330 to be concavely curved to have a uniform curvature when viewed from an X-Y plan view sense.

The lower substrate 310 includes a first base substrate 312 which is concavely curved to have a uniform curvature. A plurality of gate lines GL, a gate insulation layer GI, an activation layer AP, a plurality of data lines DL and a plurality of switching elements (not shown) connected to the gate lines GL and the data lines DL, respectively, are formed on the first base substrate 312. A passivation layer PL is formed on the gate insulation layer GI and the switching element. A color filter layer 314 is formed on the passivation layer PL. A pixel electrode PE connected to a drain electrode of the switching element is formed on the color filter layer 314.

In the present exemplary embodiment, the overlapped different colors portion of the color filters layer 314 is planarized so as to define a stepless landing zone region PLA. The color filter layer 314 may include a first color filter transmitting a first color light and a second color filter transmitting a second color light. Conventionally, since a first color filter is partially formed on a pixel area and then a second color filter is formed thereon, a height of an overlapped portion between the first color filter and the second color filter is higher than a height of the first color filter taken alone or a height of the second color filter taken alone thereby defining a stepped feature. However, in the present exemplary embodiment, an overlapped portion of the color filters layer 314 is planarized to define a stepless preliminary contact area PCA1 disposed within the rest of the planarized landing zone area PLA. In the present exemplary embodiment, a height of the preliminary contact area PCA1 is substantially equal to that of the planarized area PLA. Thus, a stepped portion does not exist in the preliminary contact area PCA1 or in the rest of the planarized area PLA.

The upper substrate 330 is combined with the lower substrate 310 to receive the liquid crystal layer 320 therebetween. The upper substrate 330 includes a concavely curved second base substrate 332 and a light-blocking layer 334 formed in correspondence with a gate lines GL of the lower substrate 310. A common electrode layer 336 is formed to cover the second base substrate 332 and the light-blocking layer 334. A column spacer 338 is fixedly formed on and protruding downwardly from the common electrode layer 336. In the present exemplary embodiment, the column spacer 338 is formed on an area which corresponds to a planarized area PLA defined on the lower substrate 310.

In the present exemplary embodiment, a light-blocking layer 334 does not exist on an area corresponding to the data lines DL of the lower substrate 310. Thus, the light-blocking layer 334 is formed in a stripe type in parallel with the gate lines GL.

Figure 7:
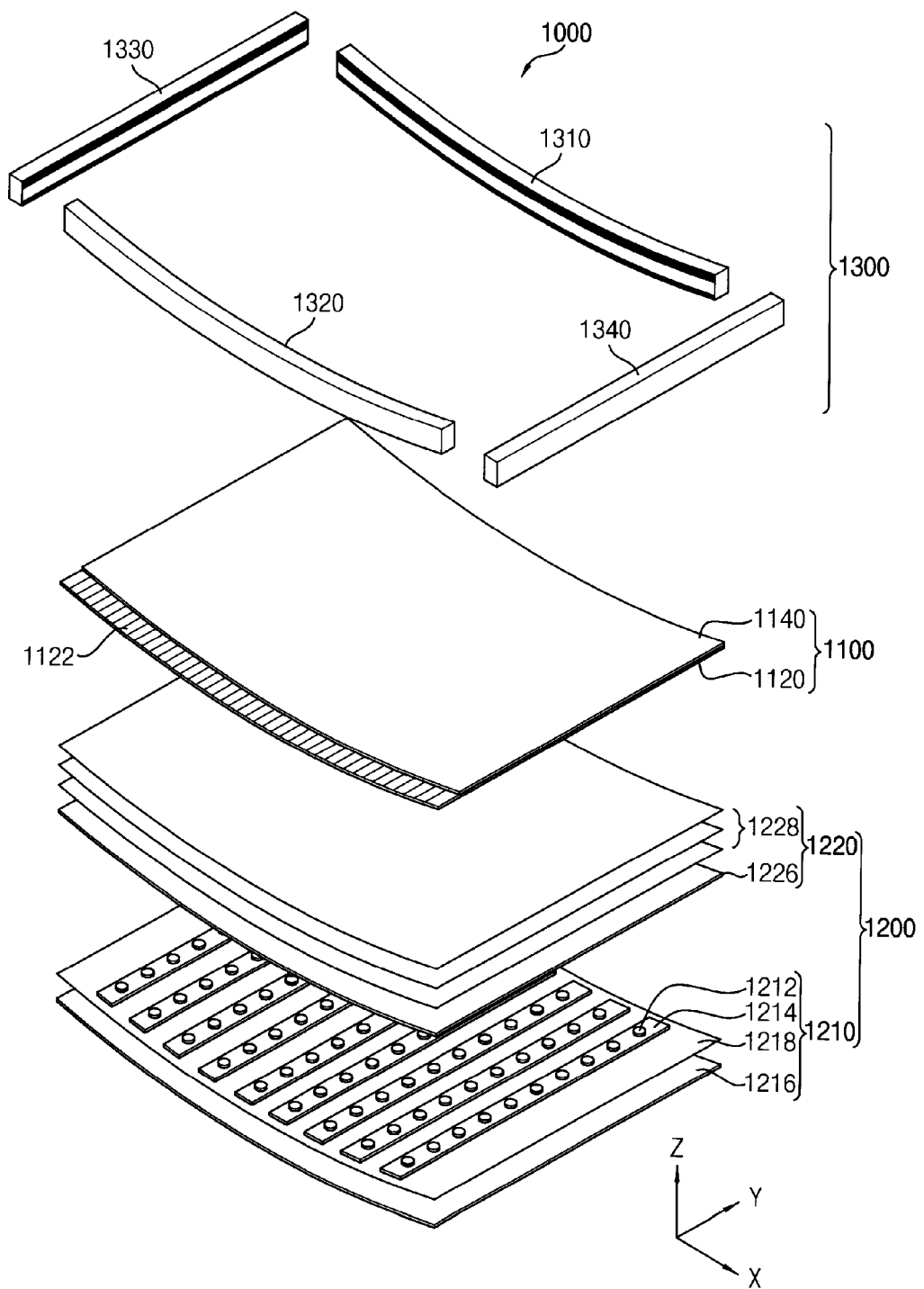
FIG. 7 is an exploded perspective view schematically illustrating an example of a curved LCD device having the curved LCD panel shown in FIG. 1.

FIG. 7 is an exploded perspective view schematically illustrating an example of a curved LCD device having the curved LCD panel shown in FIG. 1.

Referring to FIGS. 1 and 7, a curved LCD device 1000 includes a curved LCD panel 1100, a backlight unit 1200 and a concavely curved frame 1300 that is concavely curved to have a uniform curvature matching that of the curved LCD panel 1100, where both curvatures are those as viewed in an X-Y plan view sense. A curvature radius corresponding to the curvature may be about 1,000 mm to about 9,000 mm.

The curved LCD panel 1100 may have a curved shape of a uniform curvature when viewed from an X-Y plan sense. In the present exemplary embodiment, the curved LCD panel 1100 may include a lower substrate 1120, an upper substrate 1140 spaced apart from and facing the lower substrate 1120, and a liquid crystal layer interposed between the lower substrate 1120 and the upper substrate 1140. A size of the upper substrate 1140 is substantially smaller than that of the lower substrate 1120. Thus, an area of the lower substrate not covered by the upper substrate 1140 is exposed. A pad part 1122 is formed on an exposed area of the lower substrate 1120.

The curved LCD panel 1100 may be curved before the curved LCD panel 1100 is inserted into the concavely curved frame 1300. Alternatively, the curved LCD panel 1100 may be bent to be curved after a flexible version of the to-be curved LCD panel 1100 is inserted into the previously concavely curved frame 1300. For one example, when the curved LCD panel 1100 has a flexible type, the curved LCD panel 1100 may be curved after the curved LCD panel 1100 is inserted into the concavely curved frame 1300. For another example, when the curved LCD panel 1100 has a ridge type, the curved LCD panel 1100 may be manufactured to have a curved shape of a predetermined curvature before the curved LCD panel 1100 is inserted into the concavely curved frame 1300.

The curved LCD panel 1100 may have a curved shape by various manufacturing methods. For example, a flat display panel is disposed between a first curved mold of a convex shape and a second curved mold of a concave shape facing the first curved mold, and then the curved version of the LCD panel 1100 may be formed as such through use of a curing heat treatment and/or a pressing treatment. In this case, a bottom surface of a lower substrate of the flat display panel is disposed to contact with the first curved mold.

The lower substrate 1120 is a substrate on which TFTs that are switching elements are formed in a matrix arrangement. In the present exemplary embodiment, the lower substrate 1120 has a curved shape of uniform curvature. Each TFT has a source terminal connected to a data line, a gate terminal connected to a gate line, and a drain terminal connected to a pixel electrode of a transparent conductive material. A data pad part 1122 extended from the data line is disposed on a non-display area of the lower substrate 1120. Alternatively, a gate pad part extended from the gate line may be further disposed on the non-display area of the lower substrate 1120.

The upper substrate 1140 is disposed to face the lower substrate 1120. The upper substrate 1140 includes a red pixel, a green pixel and a blue pixel that are formed to realize colors. In the present exemplary embodiment, the upper substrate 1140 has a curved shape of uniform curvature. A common electrode is formed on the upper substrate 1140, which is opposite to the pixel electrode of the lower substrate 1120. The common electrode includes an optically transparent and electrically conductive material (e.g., ITO or IZO).

Alternatively, the curved LCD panel 1100 may include a lower substrate on which color filters are formed and an opposition substrate on which a common electrode is formed to face the lower substrate.

When power is applied to a gate terminal of the TFT and the TFT is turned on, an electric field is generated between the pixel electrode and the common electrode. The electric field varies an aligning angle of the liquid crystal molecules interposed between the lower substrate 1120 and the upper substrate 1140. Thus, a light transmittance of the liquid crystal layer is varied in accordance with the variation of the aligning angle of the liquid crystal, so a desired image may be obtained.

The curved LCD panel 1100 may include a first polarization film (not shown) disposed below the lower substrate 1120 and a second polarization film (not shown) disposed on the upper substrate 1140. The first polarization film includes a light transmitting axis of a first direction to polarize lights in a first direction. The second polarization film includes a light transmitting axis of a different second direction to polarize lights in a second direction. For example, the light transmitting axis of the first polarization film may perpendicular to the light transmitting axis of the second polarization film.

The backlight unit 1200 is disposed at a rear surface of the curved LCD panel 1100 to provide lights to the curved LCD panel 1100. In the present exemplary embodiment, the backlight unit 1200 may have a curved shape which is curved in accordance with a curvature of the curved LCD panel 1100. In the present exemplary embodiment, a curvature radius of the backlight unit 1200 may be about 1,000 mm to about 9,000 mm. In the present exemplary embodiment, when the curved LCD panel 1100 has a curvature radius of one of about 1,000 mm to about 4,000 mm, the backlight unit 1200 may have a curvature radius substantially greater than a curvature radius of the curved LCD panel 1100. For example, when the curved LCD panel 1100 has a curvature radius of about 7,000 mm, the backlight unit 1200 may have a curvature radius substantially greater than about 7,000 mm and substantially smaller than about 9,000 mm.

The backlight unit 1200 includes a light source assembly 1210 populated by light emitting sources and an optical assembly 1220 configured for enhancing light characteristics emitted from the light source assembly 1210. In the present exemplary embodiment, a curvature radius of the optical assembly 1220 may be substantially greater than a curvature radius of the curved LCD panel 1100, and may be substantially smaller than a curvature radius of the light source assembly 1210.

The light source assembly 1210 includes a plurality of light-emitting diode ("LED") packages 1212 configured for emitting lights and a printed circuit board 1214 on which the LED packages 1212 are mounted. A signal wiring (not shown) for providing the LED packages 1212 with driving voltages, is formed on the printed circuit board 1214. The light source assembly 1210 may be disposed in correspondence with a direction parallel with a long side of the curved LCD panel 1100. Alternatively, the light source assembly 1210 may be disposed in correspondence with a direction parallel with a short side of the curved LCD panel 1100.

In the present exemplary embodiment, a distance between the LED packages 1212 and the curved LCD panel 110 is substantially uniform.

Conventionally, a flat display panel is curved to be a curved LCD panel 1100 having a concave shape. In this case, an upper substrate 1140 is compressed to induce a buckling (plastic deformation) phenomenon. When the buckling phenomenon is generated, a cell gap of a liquid crystal layer may be increased in correspondence with a corresponding area. When a cell gap of a liquid crystal layer is increased in correspondence with a specific portion of a curved LCD panel, a blue transmittance ratio is decreased rather than another portion of the curved LCD panel so that yellowish tinting may be generated.

Thus, in the present exemplary embodiment, in order to prevent a blue transmittance ratio inducing the yellowish tinting from being increased, it may vary a disposing or a structure of the LED packages 1212. For example, when viewed from an X-Y plan sense of the curved LCD panel 1100, a light amount of blue, which are emitted from the LED packages 1212 disposed on a middle area between a central portion parallel with Y-axis and an edge portion parallel with Y-axis, may be increased. For one example, it may increase the number of blue LEDs rather relative to the number of red LEDs or the number of green LEDs, thereby increasing a light amount in the blue portion of the spectrum. For another example, it may increase a voltage provided to the blue LED's as compared to that provided to the red LED's and/or the voltage provided to the green LED's, thereby increasing a light amount of blue portion of the spectrum.

The light source assembly 1210 may further include a bottom plate 1216 and a reflection sheet 1218.

The bottom plate 1216 has a curved shape of a uniform curvature to secure the light source assembly 1210. In the present exemplary embodiment, the bottom plate 1216 secures printed circuit boards 1214 having LED packages 1212 mounted thereon. In the present exemplary embodiment, the bottom plate 1216 may have a curved shape by various manufacturing methods. For example, a flat bottom plate is disposed between a first curved mold of a convex shape and a second curved mold of a concave shape facing the first curved mold, and then the bottom plate 1216 may be manufactured through a heat treatment and a pressing treatment. In this case, a bottom surface of the flat bottom plate is disposed to contact with the first curved mold.

The reflection sheet 1218 is disposed on the bottom plate 1216 and is disposed below the light source assembly 1210 to reflect lights incident from the light source assembly 1210 toward the diffusion plate 1226.

The optical assembly 1220 may include a diffusion plate 1226 and optical sheets 1228.

The diffusion plate 1226 has a curved shape of uniform curvature. The diffusion plate 1226 diffuses lights emitted from the light source assembly 1210 or lights reflected by the reflection sheet 1218 to provide the optical sheets 1228 with the diffused lights. In the present exemplary embodiment, the diffusion plate 1226 may have a curved shape by various manufacturing methods. For example, a flat diffusion plate is disposed between a first curved mold of a concave shape and a second curved mold of a convex shape facing the first curved mold, and then the diffusion plate 1226 may be manufactured through a heat treatment and/or a pressing treatment. In this case, a bottom surface of the flat bottom plate is disposed to contact with the first curved mold.

The optical sheets 1228 are disposed on the diffusion plate 1226 to increase efficiency of lights incident from the diffusion plate 1226. The optical sheets 1228 may include a diffusion sheet again diffusing lights diffused by the diffusion plate 1226 and a prism sheet condensing the lights diffused by the diffusion sheet. For one example, the prism sheet may include a vertical prism sheet condensing lights in a vertical direction and a horizontal prism sheet condensing lights in a horizontal direction.

The concavely curved frame 1300 includes an upper frame part 1310, a lower frame part 1320, a left frame part 1330 and a right frame part 1340 to secure the curved LCD panel 1100 and the backlight unit 1200 to secure the curved LCD panel 1100 and the backlight unit 1200. The concavely curved frame 1300 has a curved shape of uniform curvature.

Figure 8:
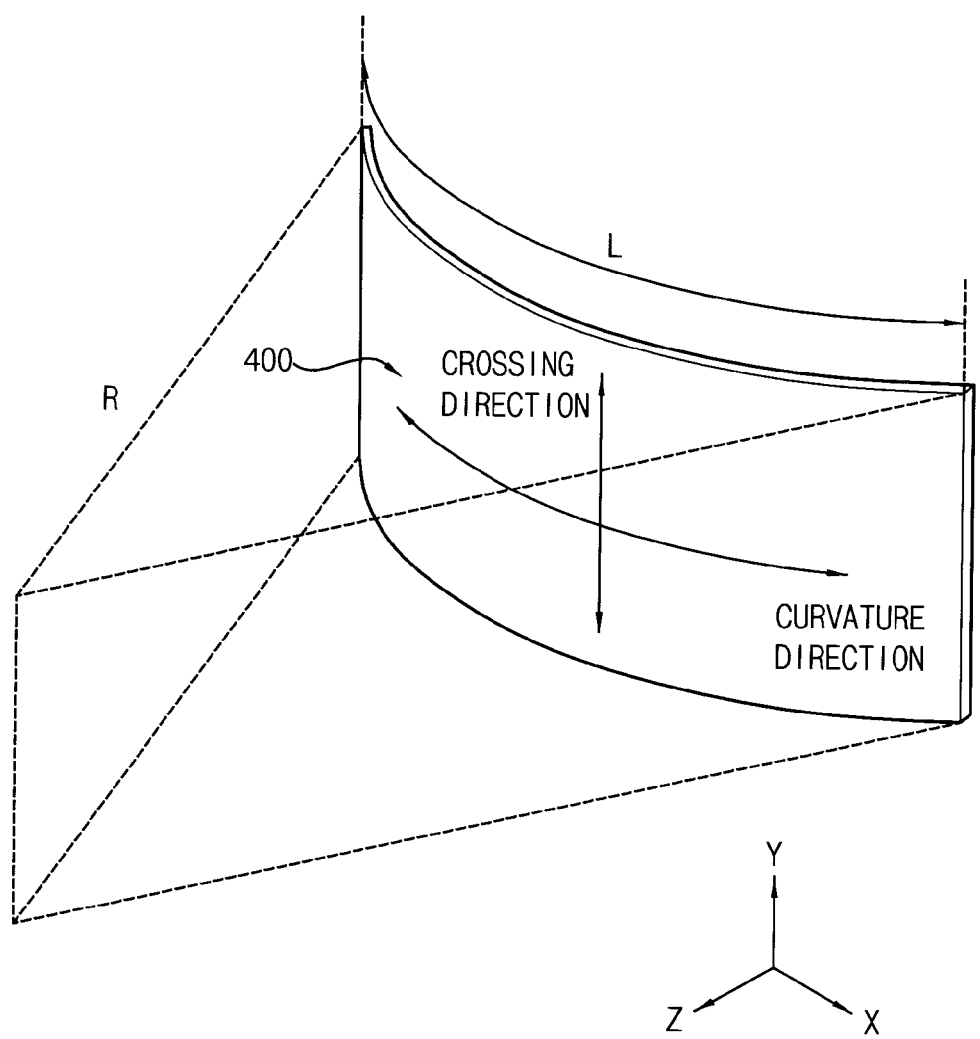
FIG. 8 is a perspective view schematically illustrating a curved LCD panel according to another exemplary embodiment.

FIG. 8 is a perspective view schematically illustrating a curved LCD panel according to another exemplary embodiment of the present invention.

Referring to FIG. 8, the curved LCD panel 400 is convexly curved to have a uniform curvature when viewed from an X-Y plan sense. A curvature radius corresponding to the curvature is about 1,000 mm to about 9,000 mm. The curved LCD panel 400 shown in FIG. 8 is substantially the same as the curved LCD panel 100 shown in FIG. 1 except for at least that the curved LCD panel 400 is convexly curved, and thus any repetitive detailed explanation may hereinafter be omitted.

Figure 9:
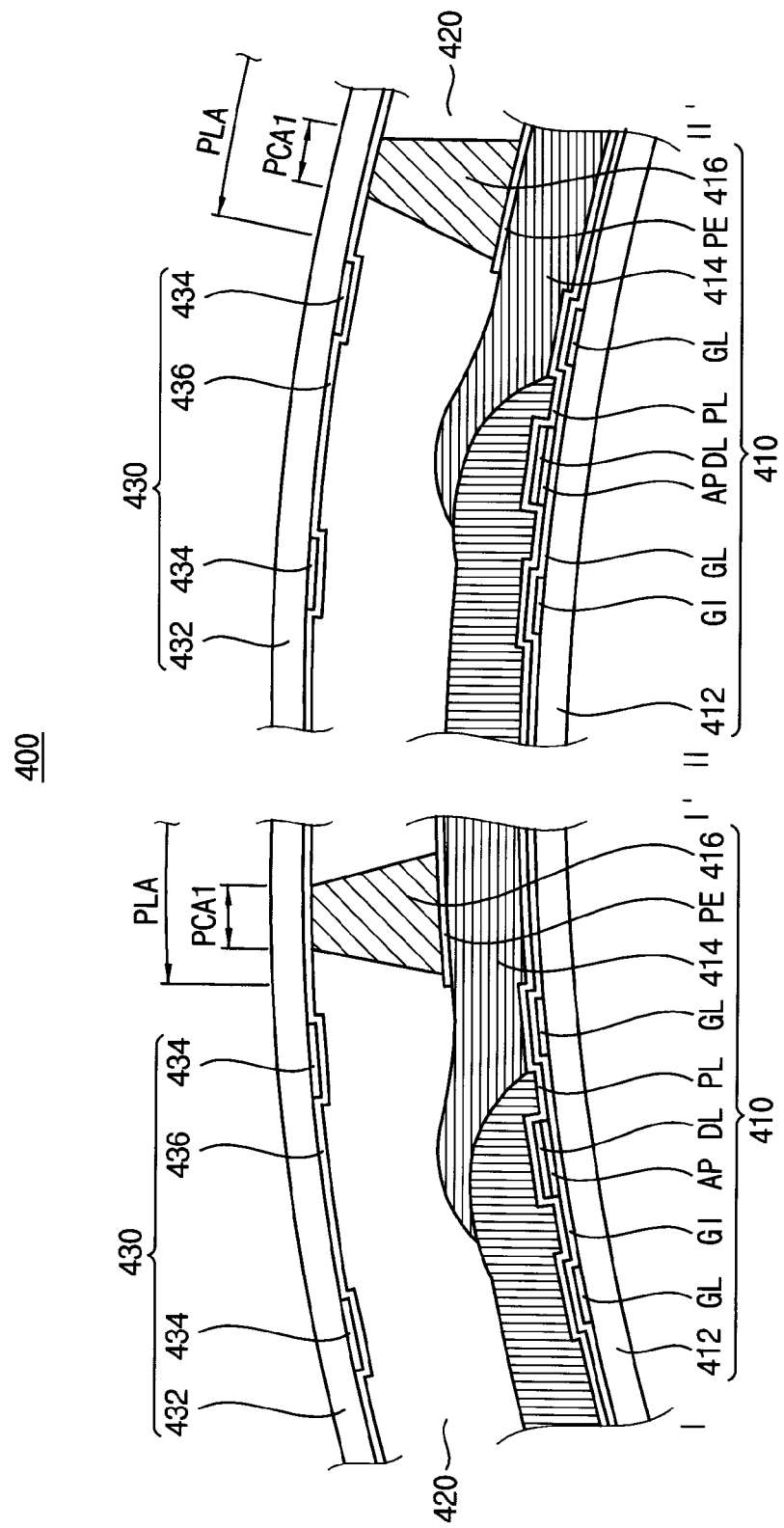
FIG. 9 is a cross-sectional view schematically illustrating an example of the curved LCD panel shown in FIG. 8.

FIG. 9 is a cross-sectional view schematically illustrating an example of the curved LCD panel shown in FIG. 8. That is, it is shown that a column spacer 416 is formed to have it base anchored on a lower substrate on which a color filter layer is formed and a light-blocking layer portion is removed from an upper substrate. For convenience of description, an area corresponding to a left portion of a curved LCD panel and an area corresponding to a right portion of the curved LCD panel are shown in FIG. 9.

Referring to FIG. 9, a curved LCD panel 400 includes a lower substrate 410, a liquid crystal layer 420 and an upper substrate 430. The LCD panel 400 is convexly curved to have a uniform curvature when viewed from an X-Y plan sense.

The lower substrate 410 includes a first base substrate 412 which is convexly curved to have a uniform curvature. A plurality of gate lines GL, a gate insulation layer GI, an active layer AP, a plurality of data lines DL and a plurality of switching elements (not shown) connected to the gate lines GL and the data lines DL, respectively, are formed on the first base substrate 412. A passivation layer PL is formed on the gate insulation layer GI and the switching element. A color filter layer 414 is formed on the passivation layer PL. A pixel electrode PE connected to a drain electrode (not shown) of the switching element is formed on the color filter layer 414. The column spacer 416 may be formed on the color filter layer 414. Moreover, the column spacer 416 may be formed to anchor directly on a portion of the pixel electrode PE and/or on a portion of the color filter layer 414.

The upper substrate 430 is combined with the lower substrate 410 to receive the liquid crystal layer 420 therebetween. The upper substrate 430 includes a second base substrate 432 which is convexly curved to have a uniform curvature and a light-blocking layer 434 which is formed on the second base substrate 432 in correspondence with a gate line GL of the lower substrate 410. A common electrode layer 436 is formed on the second base substrate 432 and the light-blocking layer 434.

The upper substrate 430 is patterned to include a preliminary contact area PCA1 corresponding to an upper contact surface of the column spacer 416 and a planarized area PLA containing the preliminary contact area PCA1. In the present exemplary embodiment, a height of the preliminary contact area PCA1 is substantially equal to that of the planarized area PLA. Thus, a stepped portion does not exist on the preliminary contact area PCA1 or the rest of the planarized area PLA.

In the present exemplary embodiment, the light-blocking layer is removed from an area corresponding to the data line DL of the lower substrate 410. Thus, the light-blocking layer is formed just in a striped type arrangement in parallel with the gate lines GL.

Figure 10:
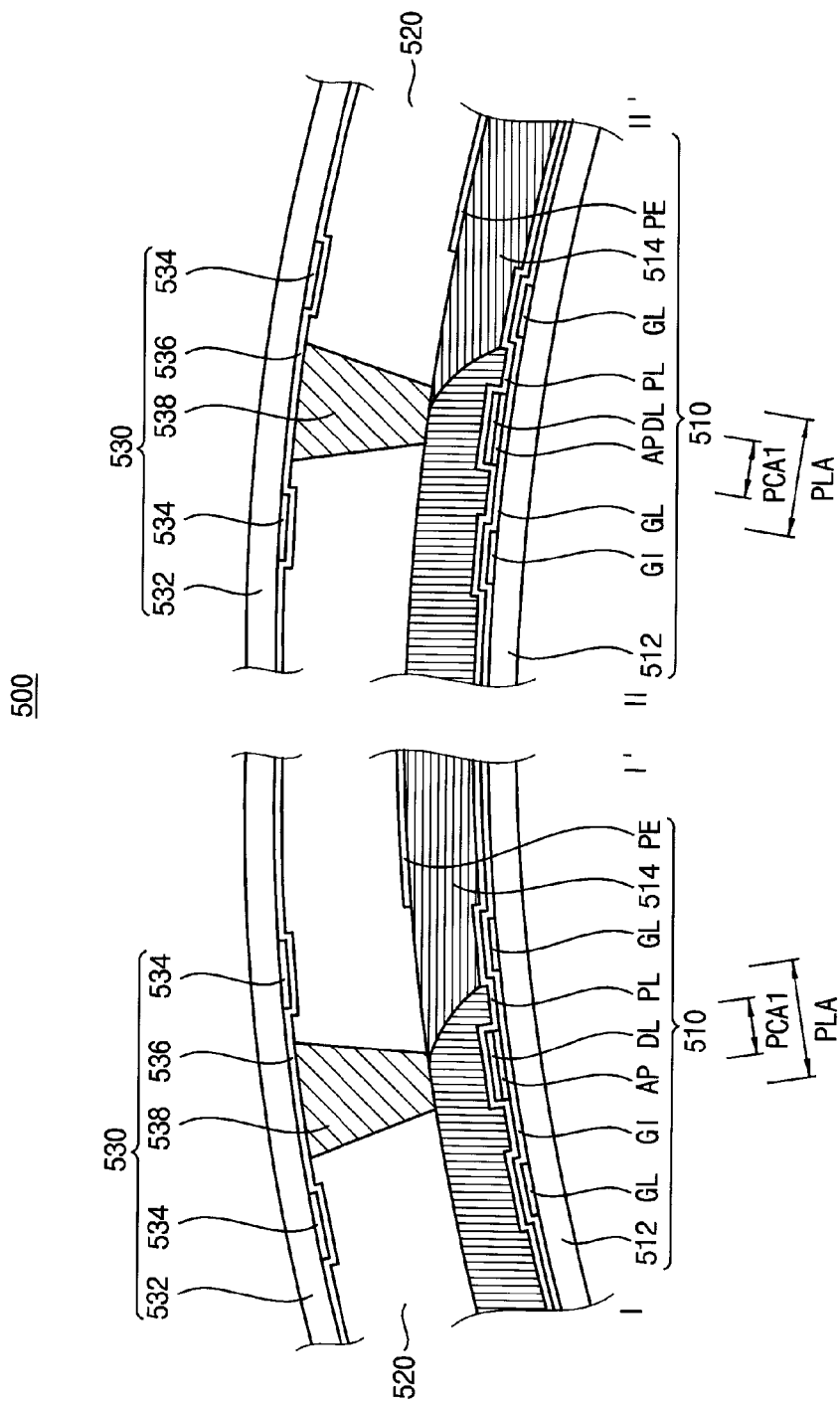
FIG. 10 is a cross-sectional view schematically illustrating another example of the curved LCD panel shown in FIG. 8.

FIG. 10 is a cross-sectional view schematically illustrating another example of the curved LCD panel shown in FIG. 8. For example, it is shown that a column spacer is formed to have its base portion anchored to the upper substrate and its contact portion disposed to make contact with an overlapped colors portion of the lower substrate where the overlapped colors portion on the lower substrate is planarized. For convenience of description, an area corresponding to a left portion of a curved LCD panel and an area corresponding to a right portion of the curved LCD panel are shown in FIG. 10.

Referring to FIG. 10, a curved LCD panel 500 includes a lower substrate 510, a liquid crystal layer 520 and an upper substrate 530. The LCD panel 500 is convexly curved to have a uniform curvature when viewed from an X-Y plan.

The lower substrate 510 includes a first base substrate 512 which is convexly curved to have a uniform curvature. A plurality of gate lines GL, a gate insulation layer GI, an active layer AP, a plurality data lines DL and a plurality switching elements (not shown) connected to the gate lines GL and the data lines DL, respectively, are formed on the first base substrate 512. A passivation layer PL is formed on the gate insulation layer GI and the switching element. A multi-colored color filters layer 514 is formed on the passivation layer PL. A pixel electrode PE connected to a drain electrode (not shown) of the switching element is formed on the color filter layer 514.

In the present exemplary embodiment, an overlapped portion of two or more of different colors of the color filters layer 314 is planarized. The color filter layer 314 may include a first color filter transmitting a first color light and a different second color filter transmitting a second color light. Conventionally, since a first color filter is partially formed on a pixel area and then a second color filter is formed thereon, a height of an overlapped portion between the first color filter and the second color filter is substantially higher than (and thus stepped relative to) a height of the first color filter alone or a height of the second color filter taken alone. However, in the present exemplary embodiment, an overlapped portion of the color filter layer 314 is planarized to define a preliminary contact area PCA1 and a remainder of the contact landing zone or planarized area PLA surrounding the preliminary contact area PCA1. In the present exemplary embodiment, a height of the preliminary contact area PCA1 is substantially equal to that of the planarized area PLA. Thus, a stepped portion does not exist on the preliminary contact area PCA1 and the planarized area PLA.

The upper substrate 530 is combined with the lower substrate 510 to receive the liquid crystal layer 520 therebetween. The upper substrate 530 includes a second base substrate 532 which is convexly curved to have a uniform curvature and a light-blocking layer 534 which is formed on the second base substrate 532 in correspondence with a gate line GL of the lower substrate 510. A common electrode layer 536 is formed to cover the second base substrate 532 and the light-blocking layer 534. A column spacer 538 is formed to have its base end anchored on the common electrode layer 536. The column spacer 538 is formed to have its opposed contact-making end disposed in correspondence with a planarized area PLA defined on the lower substrate 510.

In the present exemplary embodiment, a light-blocking layer 534 does not exist on an area corresponding to the data lines DL of the lower substrate 510. Thus, the light-blocking layer 534 is formed just in a stripes type arrangement in parallel with the gate lines GL.

Figure 11:
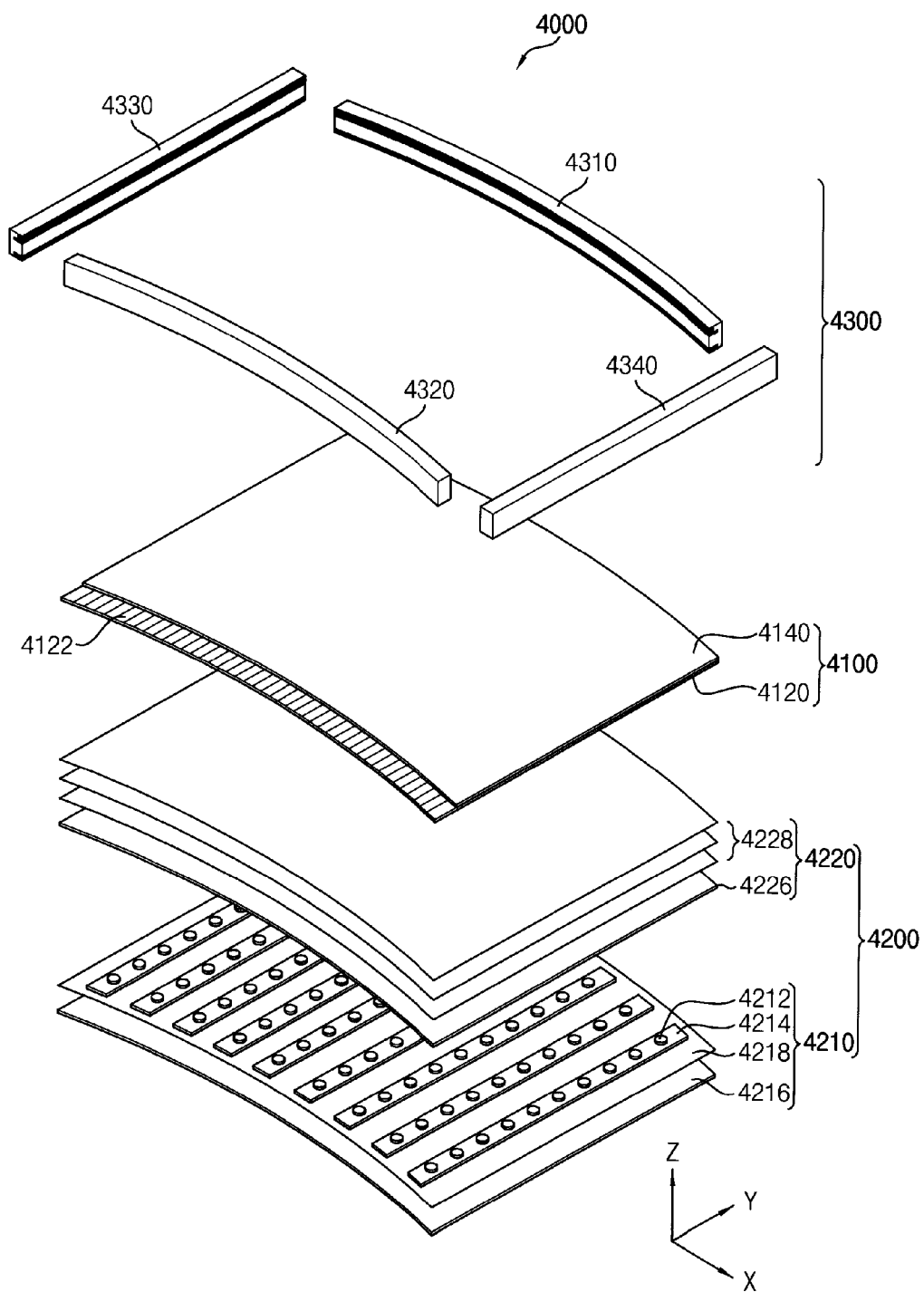
FIG. 11 is an exploded perspective view schematically illustrating an example of a curved LCD device having the curved LCD panel shown in FIG. 8.

FIG. 11 is an exploded perspective view schematically illustrating an example of a curved LCD device 4000 having the curved LCD panel shown in FIG. 8.

Referring to FIGS. 8 and 11, a curved LCD device 4000 includes a curved LCD panel 4100, a backlight unit 4200 and a convexly curved frame 4300. The LCD panel 4100 is convexly curved to have a uniform curvature when viewed from an X-Y plan. In the present exemplary embodiment, a curvature radius corresponding to the curvature is about 1,000 mm to about 9,000 mm. Alternatively, various curvature radiuses may be adapted thereto.

The curved LCD panel 4100 may have a curved shape of uniform curvature when viewed from an X-Y plan sense. In the present exemplary embodiment, the curved LCD panel 4100 may include a lower substrate 4120, an upper substrate 4140 facing the lower substrate 4120, and a liquid crystal layer interposed between the lower substrate 4120 and the upper substrate 4140. A size of the upper substrate 4140 is substantially smaller than that of the lower substrate 4120. Thus, an area which is not covered by the upper substrate 4140 is exposed. A pad part 4122 is formed on an exposed area of the lower substrate 4120.

The curved LCD panel 4100 may be curved before the curved LCD panel 4100 is inserted into the convexly curved frame 4300. Alternatively, the curved LCD panel 4100 may be curved after the curved LCD panel 4100 is inserted into the convexly curved frame 4300. For one example, when the curved LCD panel 4100 is a flexible type, the curved LCD panel 4100 may be curved after the curved LCD panel 4100 is inserted into the already convexly curved frame 4300. For another example, when the curved LCD panel 4100 has a ridge type, the curved LCD panel 4100 may be manufactured to have a curved shape of a predetermined curvature before the curved LCD panel 4100 is inserted into the convexly curved frame 4300.

The curved LCD panel 4100 may have a curved shape by various manufacturing methods. For example, a flat LCD panel is disposed between a first curved mold of a convex shape and a second curved mold of a concave shape facing the first curved mold, and then the curved LCD panel 4100 may be manufactured through a heat treatment and/or a pressing treatment. In this case, a bottom surface of an upper substrate of the flat LCD panel is disposed to contact with the first curved mold.

The lower substrate 4120 is a substrate on which TFTs that are switching elements are formed in a matrix organization. In the present exemplary embodiment, the lower substrate 4120 has a curved shape of uniform curvature. The TFT has a source terminal connected to a data line, a gate terminal connected to a gate line, and a drain terminal connected to a pixel electrode of a transparent conductive material. A data pad part 4122 extended from the data line is disposed on an image non-displaying area of the lower substrate 4120. Alternatively, a gate pad part extended from the gate line may be further disposed in a non-display area of the lower substrate 4120.

The upper substrate 4140 is disposed to face the lower substrate 4120. The upper substrate 4140 includes a red pixel, a green pixel and a blue pixel that are formed to realize colors. In the present exemplary embodiment, the upper substrate 4140 has a curved shape of uniform curvature. A common electrode is formed on the upper substrate 4140, which is opposite to the pixel electrode of the lower substrate 4120. The common electrode includes an optically transparent and electrically conductive material.

Alternatively, the curved LCD panel 4100 may include an upper substrate on which color filters are formed and an opposition substrate on which a common electrode is formed to face the upper substrate.

When power is applied to a gate terminal of the TFT and the TFT is turned on, an electric field is generated between the pixel electrode and the common electrode. The electric field varies an aligning angle of the liquid crystal molecules interposed between the lower substrate 4120 and the upper substrate 4140. Thus, a light transmittance of the liquid crystal layer is varied in accordance with the variation of the aligning angle of the liquid crystal, so a desired image may be obtained.

The curved LCD panel 4100 may include a first polarization film (not shown) disposed below the lower substrate 4120 and a second polarization film (not shown) disposed on the upper substrate 4140. The first polarization film includes a light transmitting axis of a first direction to polarize lights in a first direction. The second polarization film includes a light transmitting axis of a different second direction to polarize lights in a second direction. For example, the light transmitting axis of the first polarization film may perpendicular to the light transmitting axis of the second polarization film.

The backlight unit 4200 is disposed at a rear surface of the curved LCD panel 4100 to provide lights to the curved LCD panel 4100. In the present exemplary embodiment, the backlight unit 4200 has a curved shape which is curved in accordance with a curvature of the curved LCD panel 4100. In the present exemplary embodiment, a curvature radius of the backlight unit 1200 may be about 1,000 mm to 4,000 mm. In the present exemplary embodiment, when the curved LCD panel 4100 has a curvature radius of one of about 1,000 mm to about 9,000 mm, the backlight unit 4200 may have a curvature radius substantially smaller than a curvature radius of the curved LCD panel 4100. For example, when the curved LCD panel 4100 has a curvature radius of about 7,000 mm, the backlight unit 4200 may have a curvature radius substantially greater than about 1,000 mm and substantially smaller than about 7,000 mm.

The backlight unit 4200 includes a light source assembly 4210 with multi-colored light sources configured for emitting lights of different colors and an optical assembly 4220 enhancing light characteristics emitted from the light sources assembly 4210. In the present exemplary embodiment, a curvature radius of the optical assembly 4220 may be substantially smaller than a curvature radius of the curved LCD panel 4100, and may be substantially greater than a curvature radius of the light source assembly 4210.

The light source assembly 4210 includes a plurality of LED packages 4212 emitting lights and a printed circuit board 4214 on which the LED packages 4212 are mounted. A signal wiring (not shown) for providing the LED packages 4212 with driving voltages, is formed on the printed circuit board 4214. The light source assembly 4210 may be disposed in correspondence with a direction parallel with a long side of the curved LCD panel 4100. Alternatively, the light source assembly 4210 may be disposed in correspondence with a direction parallel with a short side of the curved LCD panel 4100.

Moreover, in order to prevent a blue transmittance ratio from being decreased by a buckling phenomenon generated in the curved LCD panel 4100, the design may include a variation in the disposing of or the structures of the LED packages 4212 across the area of the display. For example, when viewed from an X-Y plan of the curved LCD panel 4100, a light amount of blue, which are emitted from the LED packages 4212 disposed on a middle area between a central portion parallel with Y-axis and an edge portion parallel with Y-axis, may be increased. For one example, it may increase the number of blue LEDs rather than the number of red LEDs or the number of green LEDs, thereby increasing a light amount of the blue part of the spectrum in areas where there are more blue LED's. For another example, it may increase a voltage provided to the blue LED's rather than a voltage provided to the red LED's of the same area portion or a voltage provided to the green LED's of that area portion, thereby increasing a relatively light amount in the blue part of the spectrum.

The light source assembly 4210 may further include a bottom plate 4216 and a reflection sheet 4218.

The bottom plate 4216 has a curved shape of a uniform curvature to secure printed circuit boards 4214 having LED packages 4212 mounted thereon. In the present exemplary embodiment, the bottom plate 4216 may have a curved shape by various manufacturing methods. For example, a flat bottom plate is disposed between a first curved mold of a concave shape and a second curved mold of a convex shape facing the first curved mold, and then the bottom plate 4216 may be manufactured through a heat treatment and/or a pressing treatment. In this case, a bottom surface of the flat bottom plate is disposed to contact with the second curved mold.

The reflection sheet 4218 is disposed on the bottom plate 4216 and is disposed below the light source assembly 4210 to reflect lights incident from the light source assembly 4210 toward the diffusion plate 4226.

The optical assembly 4220 may include a diffusion plate 4226 and optical sheets 4228.

The diffusion plate 4226 has a curved shape of uniform curvature. The diffusion plate 4226 diffuses lights emitted from the light source assembly 4210 or lights reflected by the reflection sheet 4218 to provide the optical sheets 4228 with the diffused lights. In the present exemplary embodiment, the diffusion plate 4226 may have a curved shape by various manufacturing methods. For example, a flat diffusion plate is disposed between a first curved mold of a concave shape and a second curved mold of a convex shape facing the first curved mold, and then the diffusion plate 4226 may be manufactured through a heat treatment and/or a pressing treatment. In this case, a bottom surface of the flat bottom plate is disposed to contact with the second curved mold.

The optical sheets 4228 are disposed on the diffusion plate 4226 to increase efficiency of lights incident from the diffusion plate 4226. The optical sheets 4228 may include a diffusion sheet again diffusing lights diffused by the diffusion plate 4226 and a prism sheet condensing the lights diffused by the diffusion sheet. For one example, the prism sheet may include a vertical prism sheet condensing lights in a vertical direction and a horizontal prism sheet condensing lights in a horizontal direction.

The convexly curved frame 4300 includes an upper frame part 4310, a lower frame part 4320, a left frame part 4330 and a right frame part 4340 to secure the curved LCD panel 4100 and the backlight unit 4200. The convexly curved frame 4300 has a curved shape of uniform curvature.

As described above, according to the present disclosure of invention, a planarized area (meaning a non-stepped area) that include a non-stepped preliminary contact area corresponding to where an upper contact surface of a column spacer is designed to make contact is provided so as to prevent a cell gap from being varied due to a misalignment between a first substrate and a second substrate even through an LCD panel is curved. Thus, it may remove display defects due to a cell gap variation, thereby enhancing display characteristics.

Having described exemplary embodiments of the present disclosure of invention, it is further noted that it will be readily apparent to those of reasonable skill in the art in light of the foregoing that various modifications may be made without departing from the spirit and scope of the present teachings.

What is claimed is:

1. A curved liquid crystal display panel comprising:
   a first substrate comprising a column spacer, the column spacer having a base portion anchored to the first substrate and an opposed contact making end;
   a liquid crystal layer; and
   a second substrate spaced apart from the first substrate and comprising a preliminary contact area corresponding to a preliminary disposition of the contact making end of the column spacer, the preliminary contact area being part of a larger non-stepped area (planarized area), the second substrate being combined with the first substrate to receive the liquid crystal layer in the spacing therebetween,
   wherein the opposed contact making end of the column spacer is free to shift along a surface of the second substrate, and
   wherein the second substrate comprises a lower substrate on which a plurality of switching elements and a color filter layer covering the switching element are formed, and
   wherein the color filter layer comprises a first color filter layer and a different second color filter layer, and
   wherein an overlapped portion of the first color filter layer and the second color filter layer is planarized to define the non-stepped area, and
   wherein the non-stepped area defined by the first and second color filter layers is formed along a curvature direction of the curved liquid crystal display panel.

2. The curved liquid crystal display panel of claim 1, wherein a length of the non-stepped area is in proportion to a size of the curved liquid crystal display panel and is in inverse proportion to a curvature radius of the curved liquid crystal display panel.

3. The curved liquid crystal display panel of claim 1, wherein a length of the non-stepped area satisfies the following equation:

$$D \geq \frac{L \times T}{R} \times 0.1,$$

wherein, 'D' denotes a length of the non-stepped area, denotes a length of a panel in parallel with a curvature direction, 'T' denotes a thickness of a base substrate of the first substrate or a thickness of a base substrate of the second substrate, and 'R' denotes a curvature radius.

4. The curved liquid crystal display panel of claim 1, wherein the first substrate comprises a lower substrate on which a plurality of switching elements is formed, and
   wherein the column spacer is fixedly anchored on and protrudes from the first substrate.

5. The curved liquid crystal display panel of claim 4, wherein the second substrate comprises a light-blocking layer formed in a stripes only configuration parallel with each other, and
   wherein the stripes of the light-blocking layer are in parallel with gate lines connected to the switching element.

6. The curved liquid crystal display panel of claim 1, wherein the first substrate comprises a lower substrate on which a plurality of switching elements and a color filter layer covering the switching element are formed, and
   wherein the column spacer is formed on the color filter layer.

7. The curved liquid crystal display panel of claim 1, wherein the second substrate comprises a lower substrate on which a plurality of switching elements is formed.

8. The curved liquid crystal display panel of claim 7, wherein the first substrate comprises a light-blocking layer formed in a stripes only configuration in parallel with each other, and
   wherein the light-blocking layer is in parallel with gate lines connected to the switching element.

9. The curved liquid crystal display panel of claim 1, wherein the curved liquid crystal display panel has a concave shape.

10. The curved liquid crystal display panel of claim 1, wherein the curved liquid crystal display panel has a convex shape.

11. The curved liquid crystal display panel of claim 1, wherein the column spacer has a trapezoid shape in a cross-sectional view.

* * * * *